(12) United States Patent
     Hisa

(10) Patent No.: US 10,834,327 B2
(45) Date of Patent: Nov. 10, 2020

(54) IMAGING APPARATUS, METHOD OF CONTROLLING IMAGING APPARATUS, AND RECORDING MEDIUM

(71) Applicant: CANON KABUSHIKI KAISHA, Tokyo (JP)

(72) Inventor: Kenzo Hisa, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/361,055

(22) Filed: Mar. 21, 2019

(65) Prior Publication Data
    US 2019/0306397 A1    Oct. 3, 2019

(30) Foreign Application Priority Data
    Mar. 29, 2018    (JP) .................................. 2018-065510

(51) Int. Cl.
     *H04N 5/235*    (2006.01)
     *H04N 5/232*    (2006.01)

(52) U.S. Cl.
     CPC ......... *H04N 5/2352* (2013.01); *H04N 5/2351* (2013.01); *H04N 5/2355* (2013.01); *H04N 5/23293* (2013.01)

(58) Field of Classification Search
     CPC ......... H04N 5/23293; H04N 5/232939; H04N 5/2351; H04N 5/2352; H04N 5/2355; H04N 5/238
     See application file for complete search history.

(56) References Cited

U.S. PATENT DOCUMENTS

| | | | | |
|---|---|---|---|---|
| 7,800,686 | B2 * | 9/2010 | Meguro | H04N 5/238 348/361 |
| 8,885,093 | B2 * | 11/2014 | Asoma | H04N 5/235 348/364 |
| 2005/0270397 | A1 * | 12/2005 | Battles | H04N 5/2351 348/333.01 |
| 2007/0236567 | A1 * | 10/2007 | Pillman | H04N 5/2351 348/143 |
| 2010/0020198 | A1 * | 1/2010 | Okamoto | H04N 5/2351 348/231.99 |

FOREIGN PATENT DOCUMENTS

| | | | |
|---|---|---|---|
| JP | 2004-289348 | A | 10/2004 |
| JP | 2004289348 | A * | 10/2004 |

* cited by examiner

*Primary Examiner* — Amy R Hsu
(74) *Attorney, Agent, or Firm* — Canon U.S.A., Inc. IP Division

(57) ABSTRACT

An imaging apparatus includes an imaging device, an optical member that adjusts an amount of light of an object image incident on the imaging device, at least one memory storing a program, and at least one processor that when executing the program is configured to adjust transmittance of the optical member, amplify an image signal output when an image of an object is captured using the imaging device, and control exposure by changing an exposure condition including an exposure index.

13 Claims, 10 Drawing Sheets

FIG.4

| EI | | 12 | 25 | 50 | 100 | 200 | 400 | 800 | 1600 | 3200 |
|---|---|---|---|---|---|---|---|---|---|---|
| D-RANGE-ORIENTED SETTING | ND | 3stops | 3stops | 3stops | 3stops | 2stops | 1stop | 0stop | 0stop | 0stop |
| | AMPLIFICATION FACTOR | ×1 | ×2 | ×4 | ×8 | ×8 | ×8 | ×8 | ×16 | ×32 |
| S/N-ORIENTED SETTING | ND | 3stops | 2stops | 1stop | 0stop | 0stop | 0stop | 0stop | 0stop | 0stop |
| | AMPLIFICATION FACTOR | ×1 | ×1 | ×1 | ×1 | ×2 | ×4 | ×8 | ×16 | ×32 |

FIG.5

| AMPLIFICATION FACTOR | ×1 | ×2 | ×4 | ×8 | ×16 | ×32 |
|---|---|---|---|---|---|---|
| GAIN | 0 dB | 0 dB | 0 dB | 0 dB | 6 dB | 12 dB |
| GAMMA CORRECTION CHARACTERISTICS | 200% | 400% | 800% | 1600% | 1600% | 1600% |

FIG. 10

| | EI | 12 | 25 | 50 | 100 | 200 | 400 | 800 | 1600 | 3200 |
|---|---|---|---|---|---|---|---|---|---|---|
| 200% | ND | 3stops | 2stops | 1stop | 0stop | 0stop | 0stop | 0stop | 0stop | 0stop |
| | AMPLIFICATION FACTOR | ×1 | ×1 | ×1 | ×1 | ×2 | ×4 | ×8 | ×16 | ×32 |
| 400% | ND | 3stops | 3stops | 2stops | 1stop | 0stop | 0stop | 0stop | 0stop | 0stop |
| | AMPLIFICATION FACTOR | ×1 | ×2 | ×2 | ×2 | ×2 | ×4 | ×8 | ×16 | ×32 |
| 800% | ND | 3stops | 3stops | 3stops | 2stops | 1stop | 0stop | 0stop | 0stop | 0stop |
| | AMPLIFICATION FACTOR | ×1 | ×2 | ×4 | ×4 | ×4 | ×4 | ×8 | ×16 | ×32 |
| 1600% | ND | 3stops | 3stops | 3stops | 3stops | 2stops | 1stop | 0stop | 0stop | 0stop |
| | AMPLIFICATION FACTOR | ×1 | ×2 | ×4 | ×8 | ×8 | ×8 | ×8 | ×16 | ×32 |

IMAGING APPARATUS, METHOD OF CONTROLLING IMAGING APPARATUS, AND RECORDING MEDIUM

BACKGROUND OF THE INVENTION

Field of the Invention

The present disclosure relates to exposure control of an imaging apparatus, and in particular to an imaging apparatus that can change an exposure index, a method of controlling the imaging apparatus, and a recording medium.

Description of the Related Art

In recent years, an imaging apparatus such as a video camera has included a function to control exposure during and after imaging of an object as control to change brightness of image data acquired by the imaging of the object. To control the exposure, exposure conditions, such as an aperture diameter of a diaphragm, light transmittance of an optical filter such as a neutral density (ND) filter, a charge accumulation time of an imaging device, and an amplification factor of an image signal are commonly changed. For simplification of description, in the following description, the exposure conditions are referred to as diaphragm, transmittance of ND filter, accumulation time, and amplification factor. These exposure conditions are optionally changed by a user's manual operation, are changed by automatic control by an imaging apparatus, or are changed by a combination of partial manual operation by the user and the automatic control by the imaging apparatus.

A system that converts the exposure conditions into additive system of photographic exposure (APEX) units and thereby generally controls the exposure in order to simplify exposure control has been well-known. The proper exposure conditions corresponding to luminance of the object are settable by total adjustment of the diaphragm, the accumulation time (shutter speed), and the amplification factor (imaging sensitivity) based on the luminance of the object. A depth of field is changed when the diaphragm is changed, and smoothness of a moving image is changed when the accumulation time is changed. It has been desired to control the changes of both of the transmittance of the ND filter and the amplification factor that do not influence the depth of field and the smoothness of the moving image in conjunction with each other. Japanese Patent Application Laid-Open No. 2004-289348 discusses a technology that sequentially changes the light transmittance of the ND filter, sensitivity of the imaging device, and a gain of an image signal processing apparatus without changing the diaphragm as much as possible, thereby performing automatic sensitivity adjustment.

SUMMARY OF THE INVENTION

According to an aspect of the present disclosure, an imaging apparatus includes an imaging device, an optical member configured to adjust an amount of light of an object image incident on the imaging device, at least one memory storing a program, and at least one processor that when executing the program is configured to adjust transmittance of the optical member, amplify an image signal output when an image of an object is captured using the imaging device, and control exposure by changing an exposure condition including an exposure index. A value of the exposure index is settable by a user from predetermined discrete values. A combination of an amplification factor of the image signal to be used in amplifying the image signal and the transmittance of the optical member is predetermined for each exposure index settable by the user.

Further features of the present disclosure will become apparent from the following description of exemplary embodiments with reference to the attached drawings.

BRIEF DESCRIPTION OF THE DRAWINGS

FIG. 4 is a diagram illustrating a combination of the transmittance of the ND filter and a signal amplification factor according to the first exemplary embodiment of the present disclosure.

FIG. 5 is a diagram illustrating a combination of the gain and a gamma corresponding to the amplification factor according to the first exemplary embodiment of the present disclosure.

FIG. 10 is a diagram illustrating a combination of the transmittance of the ND filter and an amplification factor corresponding to a dynamic (D) range according to the third exemplary embodiment of the present disclosure.

DESCRIPTION OF THE EMBODIMENTS

Figure 1:
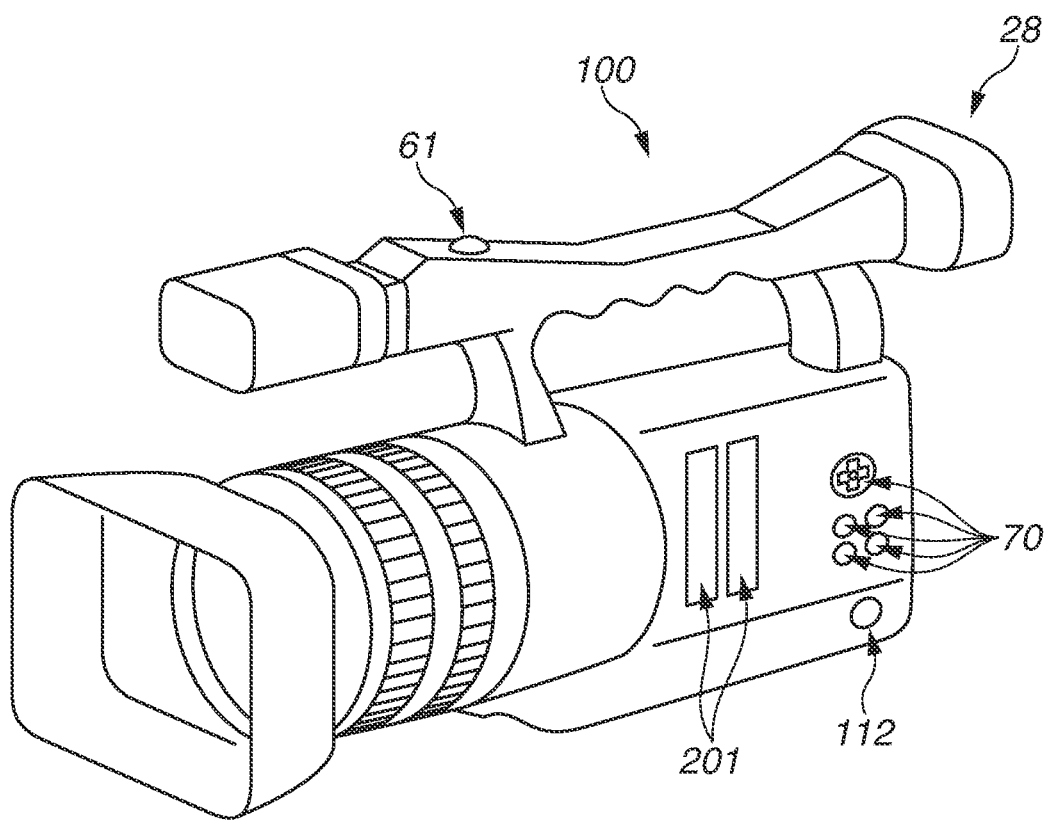
FIG. 1 is an external view illustrating an imaging apparatus according to a first exemplary embodiment of the present disclosure.

Embodiments of the present disclosure are described in detail with reference to accompanying drawings. FIG. 1 is an external view illustrating an imaging apparatus 100 according to a first exemplary embodiment of the present disclosure. In the present exemplary embodiment, a case where the imaging apparatus 100 is a digital video camera is illustrated. The imaging apparatus 100 includes a digital camera, a network camera for monitoring, and a portable device including a camera function such as a smartphone.

In FIG. 1, a display unit 28 displays an image and various kinds of information. A recording switch 61 is an operation unit to provide an imaging instruction. A mode selection switch (not illustrated) is an operation unit to select one of various kinds of modes. An operation unit 70 includes operation members such as various kinds of buttons and a cross key to receive various kinds of operation from a user. A power switch (not illustrated because being disposed on opposite surface) switches power-on and power-off. A connector 112 is a connecter between a power connection cable and the imaging apparatus 100. A recording medium slot 201 stores a recording medium 200 (not illustrated) such as a memory card and a hard disk. The recording medium 200 stored in the recording medium slot 201 is communicable with the imaging apparatus 100.

Figure 2:
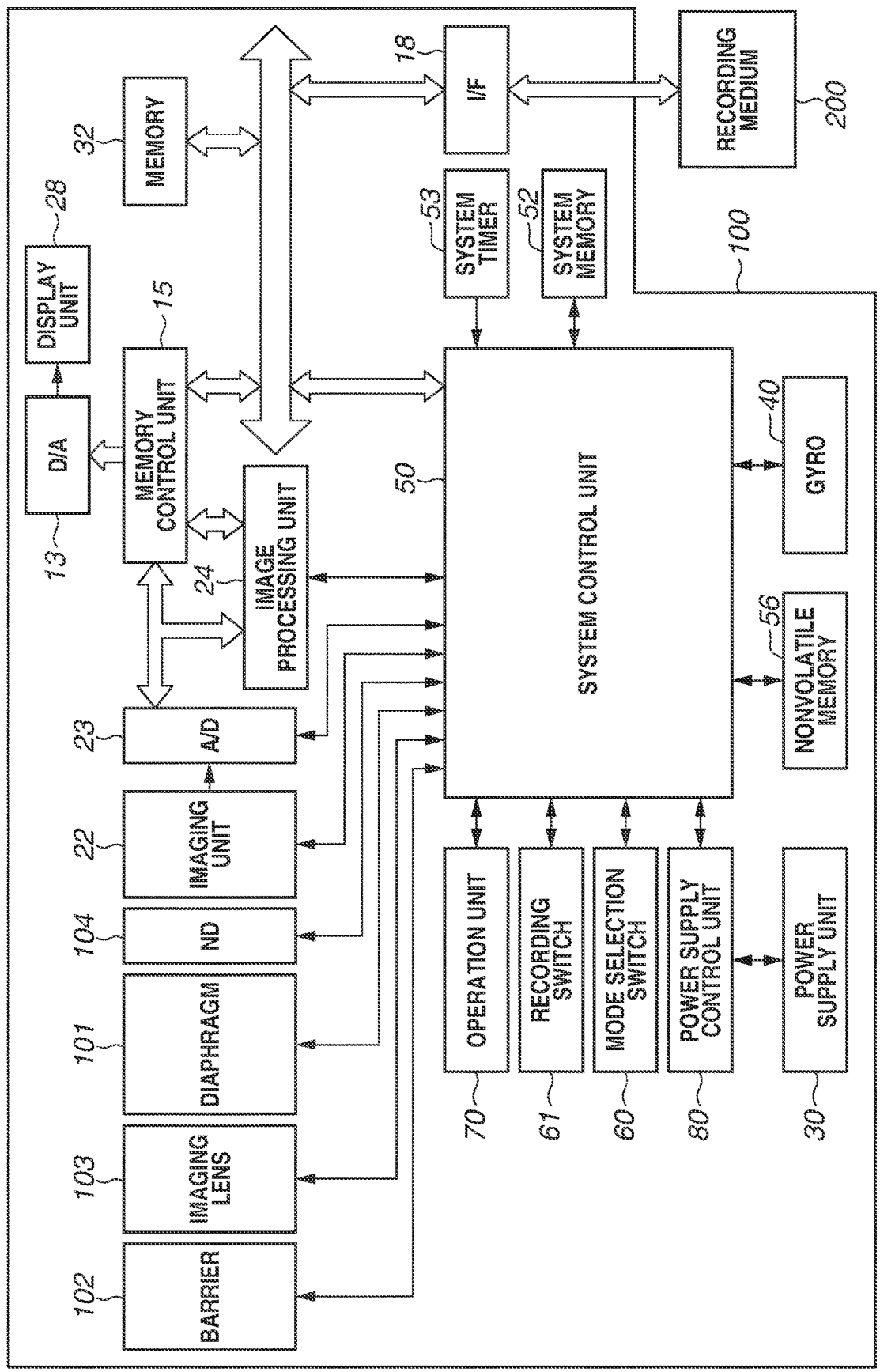
FIG. 2 is a block diagram illustrating an internal configuration of the imaging apparatus according to the first exemplary embodiment of the present disclosure.

FIG. 2 is a block diagram illustrating an internal configuration of the imaging apparatus 100 according to the first exemplary embodiment of the present disclosure. In FIG. 2, an imaging lens 103 is a lens group including a zoom lens, a focus lens, and a shift lens, and forms an image of an object. A diaphragm 101 is used to adjust a light amount. A neutral density (ND) filter 104 is an optical member to adjust (reduce) an amount of light incident on an imaging device 22a provided in an imaging unit 22 to be described below. In the present exemplary embodiment, a turret ND filter including four filters different in density is provided. The imaging unit 22 includes the imaging device 22a. The imaging device 22a includes a charge-storage solid-state imaging device such as a charge-coupled device (CCD) and a complementary metal-oxide semiconductor (CMOS) device that convert an optical image into an electric signal. The imaging unit 22 includes a function of controlling an accumulation time of the imaging device 22a by an electronic shutter, a function of changing an analog gain, a function of changing a readout speed, etc. An analog-to-digital (A/D) converter 23 is used to convert an analog signal output from the imaging unit 22 into a digital signal. A barrier 102 covers an imaging system including the imaging lens 103 of the imaging apparatus 100, thereby preventing stains and damage on the imaging system including the imaging lens 103, the diaphragm 101, and the imaging unit 22.

An image processing unit 24 performs processing on data from the A/D converter 23 or data from a memory control unit 15. The processing includes predetermined pixel interpolation processing, resize processing such as reduction processing, color conversion processing, gamma correction processing, and processing to add a digital gain. The imaging unit 22 and the image processing unit 24 described above correspond to a signal amplification unit that amplifies the analog gain and the digital gain in the present exemplary embodiment, change of an amplification factor of each of the analog gain and the digital gain is instructed by a system control unit 50 that functions as an amplification factor changing unit. The imaging unit 22 and the image processing unit 24 may also serve as the amplification factor changing unit.

The image processing unit 24 performs predetermined calculation processing with use of captured image data, and transmits a calculation result to the system control unit 50. The system control unit 50 performs exposure control, ranging control, white balance control, etc., based on the transmitted calculation result. As a result, autofocus (AF) processing, automatic exposure (AE) processing, automatic white balance (AWB) processing are performed. The system control unit 50 operates the shift lens of the imaging lens 103 in response to motion and attitude change of the imaging apparatus 100 caused by hand shake detected by a gyro 40, or the image processing unit 24 shifts an image, so that image blur is to be corrected.

Data output from the A/D converter 23 is written in a memory 32 via the image processing unit 24 and the memory control unit 15, or via the memory control unit 15. The memory 32 stores image data that has been captured by the imaging unit 22 and converted into digital data by the A/D converter 23, and image data to be displayed on the display unit 28. The memory 32 includes a sufficient memory capacity to store image signals and other various kinds of data. For example, the memory 32 includes a sufficient memory capacity to store a moving image and sound for a predetermined time.

The memory 32 also serves as an image display memory (video memory). A digital-to-analog (D/A) converter 13 converts image display data stored in the memory 32 into an analog signal, and supplies the analog signal to the display unit 28. The display image data thus written in the memory 32 is displayed on the display unit 28 via the D/A converter 13. The display unit 28 performs display corresponding to the analog signal supplied from the D/A converter 13 on a display device such as a liquid crystal display (LCD). The D/A converter 13 converts the digital signal that has been A/D-converted by the A/D converter 23 and accumulated in the memory 32, into an analog signal, and the analog signal is consecutively transferred to and displayed on the display unit 28. As a result, an electronic viewfinder is achieved and live image display is performed.

A nonvolatile memory 56 is an electrically erasable/writable memory, and for example, an electrically erasable programmable read-only memory (EEPROM) is used. The nonvolatile memory 56 stores constants, programs, etc. for operation of the system control unit 50. The programs are programs to execute processing illustrated in flowcharts to be described below.

The system control unit 50 is a control unit including a central processing unit (CPU) such as a microprocessor that totally controls the imaging apparatus 100 as a whole. The system control unit 50 executes the programs recorded in the above-described nonvolatile memory 56 to execute various processing described below in the present exemplary embodiment. A random access memory (RAM) is used for a system memory 52. The constants and variables for operation of the system control unit 50, the programs read from the nonvolatile memory 56, etc. are executed in the system memory 52. The system control unit 50 also controls the memory 32, the D/A converter 13, the display unit 28, etc. to perform display control.

A system timer 53 is a clocking unit that clocks a time used for various kinds of control and clocks a time of a built-in clock. The mode selection switch 60, the recording switch 61, and the operation unit 70 are operation units to provide various kinds of operation instructions to the system control unit 50.

The mode selection switch 60 switches an operation mode of the system control unit 50 to any of a moving image recording mode, a still image recording mode, a reproduction mode, etc. Modes included in the moving image recording mode and the still image recording mode include an automatic imaging mode, an automatic scene determination mode, a manual mode, various kinds of scene modes in which imaging setting is performed depending on a captured scene, a program AE mode, and a custom mode. The operation mode can be directly switched to any of these modes included in the moving image recording mode by operation of the mode selection switch 60. Alternatively, after the operation mode is switched to the moving image recording mode by the mode selection switch 60, the operation mode may be switched to any of these modes included in the moving image recording mode by the other operation member. The recording switch 61 switches a state between an imaging standby state and an imaging state. When the recording switch 61 is turned on, the system control unit 50 starts a series of operation from reading of the signal from the imaging unit 22 to writing of moving image data in the recording medium 200.

When various function icons displayed on the display unit 28 are selected and operated, the operation members of the operation unit 70 are appropriately assigned with functions for respective scenes and operate as various kinds of function buttons. Examples of the function buttons include an end button, a return button, an image feeding button, a jump button, an iris refining button, and an attribute change button. For example, when a menu button is pressed, a menu screen enabling various kinds of settings is displayed on the display unit 28. A user can intuitively perform various kinds of settings with use of the menu screen displayed on the display unit 28, the cross key in vertical and lateral directions, and a SET button.

A power supply control unit 80 includes a battery detection circuit, a direct current-direct current (DC-DC) converter, and a switch circuit that switches a block to be energized, and detects presence/absence of attachment of a battery, a kind of the battery, and a remaining battery level. The power supply control unit 80 controls the DC-DC converter based on results of the detection and an instruction from the system control unit 50, and supplies a necessary voltage to each of the units including the recording medium 200 for a necessary period.

A power supply unit 30 includes a primary battery such as an alkali battery and a lithium battery, a secondary battery such as a nickel-cadmium (NiCd) battery, a nickel metal hydride (NiMH) battery, and a lithium (Li) ion battery, or an alternating-current (AC) adaptor. A recording medium interface (I/F) 18 is an interface with the recording medium 200 such as a memory card and a hard disk. The recording medium 200 is a recording medium such as a memory card to record a captured image, and includes a semiconductor memory and a magnetic disc.

The imaging device 22a used in the present exemplary embodiment provides a dynamic range (D range) of the imaging apparatus 100 of 200% in a case where the transmittance of the ND filter 104 is 100% and an exposure index (EI) is 100. In other words, when proper exposure in additive system of photographic exposure (APEX) units is 20% with respect to the maximum value (200%) of the input signal in the case where the transmittance of the ND filter 104 is 100% and the exposure index EI is 100, the output signal is saturated when the input signal is 10 times (200%) the proper exposure. The exposure condition becomes brighter as the exposure index EI is increased. For example, when the exposure index EI is 200, the exposure condition is brighter by one stage than the exposure condition when the exposure index EI is 100, and when the exposure index EI is 400, the exposure condition is brighter by two stages than the exposure condition when the exposure index EI is 100. It is premised that a value of the exposure index EI is settable by a user from predetermined discrete values stored in the imaging apparatus 100.

It is premised that, when the exposure is proper, in APEX units, Av (aperture value)+Tv (accumulation time (shutter speed))=Sv (sensitivity)+Bv (brightness of object) is established. The above-described D range of the imaging apparatus 100 indicates a width of brightness at which the imaging apparatus 100 can obtain an unsaturated image by capturing an image of the object. In the present exemplary embodiment, it is assumed that the D range of a gamma curve (hereinafter, simply referred to as gamma), indicating input-output characteristics of the output signal to the input signal that is output from the imaging device 22a and includes the amplified analog gain and the amplified digital gain, is 1600%.

Figure 3:
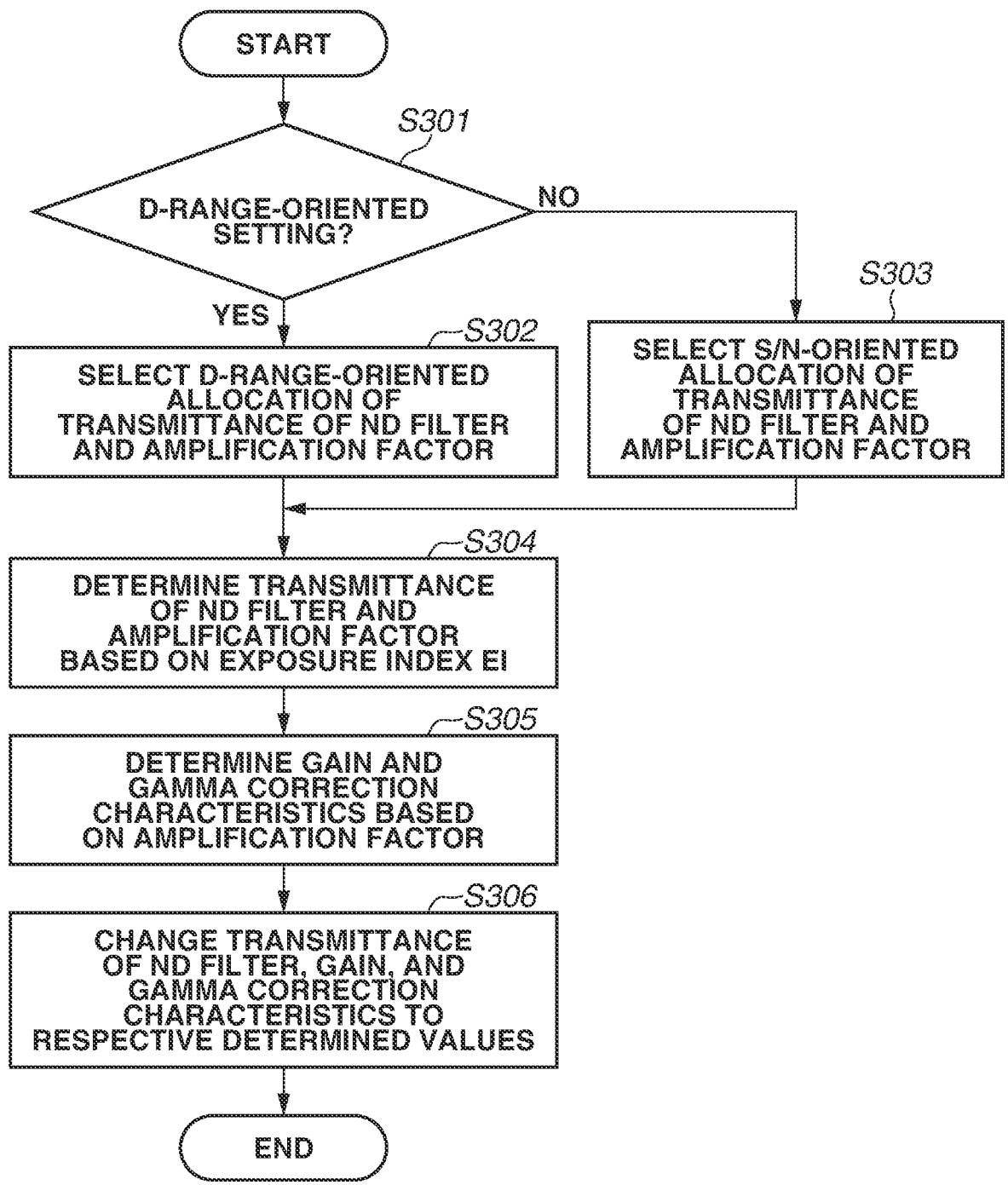
FIG. 3 is a flowchart illustrating processing to determine transmittance of a neutral density (ND) filter, a gain, and gamma correction characteristics according to the first exemplary embodiment of the present disclosure.

Processing to determine the transmittance of the ND filter 104, the gain, and the gamma correction characteristics according to the present exemplary embodiment is described with reference to FIG. 3. FIG. 3 is a flowchart illustrating the processing to determine the transmittance of the ND filter 104, the gain, and the gamma correction characteristics according to the present exemplary embodiment of the present disclosure. The flowchart illustrated in FIG. 3 is started when the imaging apparatus 100 is turned on or the imaging mode is changed, or at optional timing based on manual operation by the user.

As illustrated in FIG. 3, in step S301, the system control unit 50 determines whether the current setting of the imaging apparatus 100 is a D-range-oriented setting. The D-range-oriented setting is a setting for setting various kinds of imaging conditions in order to capture an image of the object while maintaining the D range as wide as possible with respect to the change of the exposure index EI. In the imaging apparatus 100, the D-range-oriented setting may be settable as one imaging mode. In a case where the D-range-oriented setting is not selected (i.e., in case where a signal-to-noise (S/N)-oriented setting is selected), the D range is narrowed but reduction of an S/N ratio that indicates a ratio of the signal to a noise amount can be suppressed in an image signal obtained by capturing the image of the object.

The D-range-oriented setting and the S/N-oriented setting are previously selectable by the user. For example, in the imaging apparatus 100, the user may optionally select the setting as one of selection items in the menu of the imaging apparatus 100.

In a case where the D-range-oriented setting is selected in step S301 (YES in step S301), the system control unit 50 selects a D-range-oriented combination (allocation) of the transmittance of the ND filter 104 and the amplification factor in step S302. In a case where the D-range-oriented setting is not selected in step S301 (NO in step S301), the system control unit 50 selects an S/N-oriented combination (allocation) of the transmittance of the ND filter 104 and the amplification factor in step S303.

FIG. 4 is a diagram illustrating combination of the transmittance of the ND filter 104 and the signal amplification factor according to the present exemplary embodiment of the present disclosure. In the present exemplary embodiment, relationships as illustrated in FIG. 4 are adopted as the combinations of the transmittance of the ND filter 104 and the amplification factor with respect to each exposure index (EI).

In FIG. 4, the transmittance of the ND filter 104 is represented by stops, and 0 stop, 1 stop, 2 stops, and 3 stops correspond to the transmittance of the ND filter 104 of 100%, 50%, 25%, and 12.5%, respectively. In other words, when the transmittance of the ND filter 104 is 3 stops, an amount of light incident on the imaging device 22a is reduced to ⅛ by the ND filter 104 as compared with a state where the light amount is not reduced. The amplification factor is represented by a magnification to amplify the signal, and ×2 indicates two times the signal, and ×4 indicates four times the signal. The amplification may be performed on the analog gain or the digital gain, and the amplification factor indicates at least an amplification factor of the signal amplified before the gamma curve is applied to the input signal by the gamma correction circuit.

As illustrated in FIG. 4, in the case where the D-range-oriented setting is selected, the amplification factor is increased in preference to increase of the transmittance of the ND filter 104 (i.e., decrease of light reduction amount), based on the increase of the exposure index EI. At this time, the D range reaches the maximum D range at a predetermined amplification factor. Therefore, even if the amplification factor is further increased, the D range is not increased. Accordingly, priority is given to change of the transmittance of the ND filter 104 in a state where the amplification factor is increased to the predetermined amplification factor, and the amplification factor is again increased after the transmittance reaches the maximum transmittance. The relationship between the amplification factor and the D range is described below.

In contrast, as illustrated in FIG. 4, in the case where the S/N-oriented setting is selected, the transmittance of the ND filter 104 is increased in preference to increase of the amplification factor, based on the increase of the exposure index EI. In this case, the amplification factor of the signal is increased after the transmittance of the ND filter 104 reaches the maximum transmittance (0 stop) based on the increase of the exposure index EI.

When the D-range-oriented setting and the S/N-oriented setting described above are compared, in the imaging apparatus 100 according to the present exemplary embodiment, the amplification factor of the signal in the D-range-oriented setting is larger than the amplification factor of the signal in the S/N-oriented setting at each exposure index EI within the range of 25 to 400. In the imaging apparatus 100 according to the present exemplary embodiment, the transmittance of the ND filter 104 in the S/N-oriented setting is larger than the transmittance of the ND filter 104 in the D-range-oriented setting at each exposure index EI within the range of 25 to 400.

As illustrated in FIG. 3, in step S304, the system control unit 50 determines the transmittance of the ND filter 104 and the amplification factor based on the selection result in step S302 or S303. In the present exemplary embodiment, for example, a configuration is described in which the exposure index EI is set by the user as one of exposure conditions (exposure parameters) optionally settable by the user, just like the values Av and Tv. However, the configuration is not limited thereto. For example, the system control unit 50, etc. may determine the transmittance of the ND filter 104 and the amplification factor based on the state (whether D-range-oriented setting is selected) previously selected by the user when the system control unit 50 automatically sets the most proper exposure index EI corresponding to luminance of the object.

In step S305, the system control unit 50 determines the gain and the gamma correction characteristics based on the amplification factor determined in step S304. FIG. 5 is a diagram illustrating the combination of the gain and the gamma correction characteristics based on the amplification factor according to the present exemplary embodiment of the present disclosure. As illustrated in FIG. 5, the gain indicates an amount of amplification of the analog gain or the digital gain in the imaging unit 22 executed before the gamma curve is applied to the input signal by the image processing unit 24. A unit of the gamma correction characteristics is dB. It is assumed that exposure becomes brighter by one stage in APEX units every time the gain is increased by 6 dB. As illustrated in FIG. 5, the gamma correction characteristics are represented by the D range that indicates a shape of the gamma curve. When the D range is doubled, the brightness is also doubled. The relationship between the gamma correction characteristics and the D range is described below.

The imaging device 22a according to the present exemplary embodiment provides the D range of 200% when the exposure index EI is 100. Therefore, gamma correction characteristics of 200% is set when the amplification factor is one time. Accordingly, when the amplification factor is increased, the gamma correction characteristics are firstly changed, and then the D range is expanded. More specifically, when the gamma correction characteristics are changed to 400%, 800%, and 1600%, the amplification factor become two times, four times, and eight times, respectively. In the present exemplary embodiment, for example, in the case of the gamma correction characteristics at which an upper limit of the D range is 1600%, when the amplification factor exceeds eight times, the D range is fixed to 1600%, and the gain is increased along with the subsequent increase of the amplification factor. When the gain is increased, the exposure becomes brighter in response to an increase of the gamma input signal, but the D range itself is not changed. In other words, the D range corresponding to the amplification factor of one time, two times, four times, and eight times (including more than eight times) illustrated in FIG. 4 are 200%, 400%, 800%, and 1600%, respectively. Accordingly, in the imaging apparatus 100 according to the present exemplary embodiment, the D range is wider when the D-range-oriented setting is selected than when the S/N-oriented setting is selected, in a case where the exposure index EI is within the range of 25 to 400.

Figure 6:
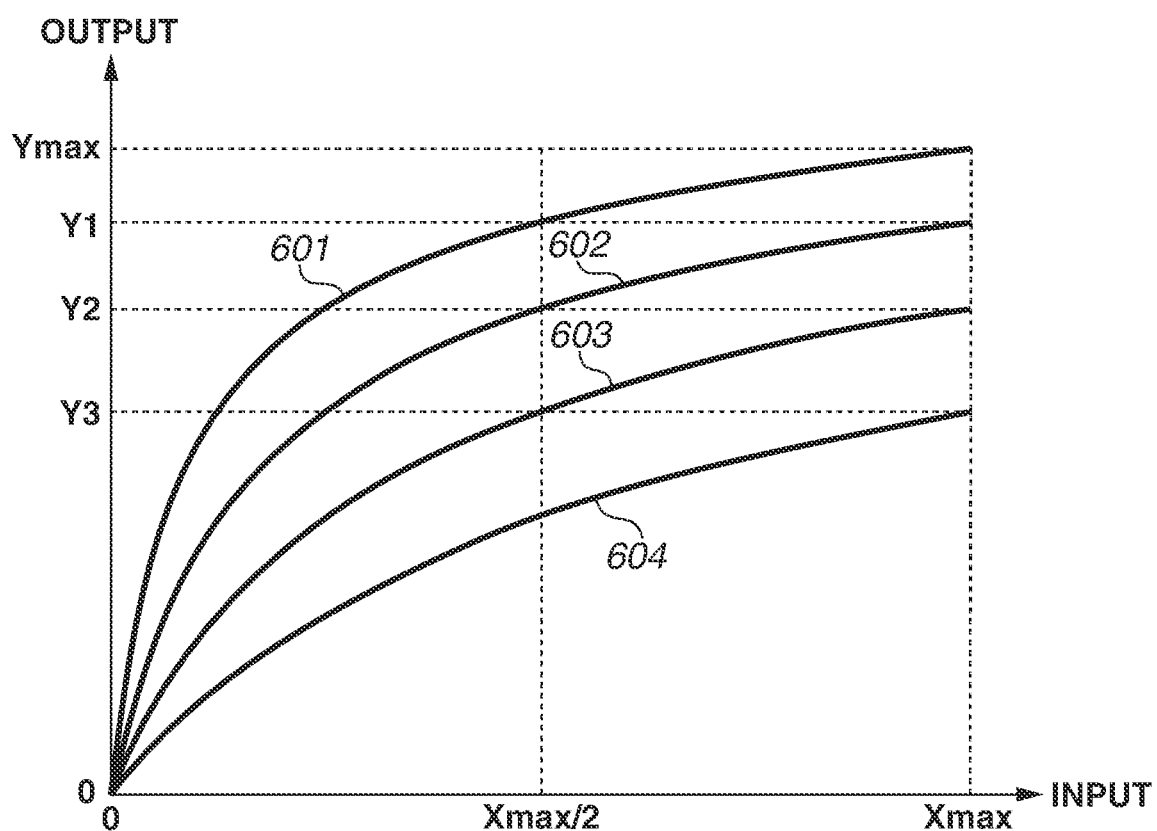
FIG. 6 is a diagram illustrating the gamma correction characteristics according to the first exemplary embodiment of the present disclosure.

The relationship between the gamma correction characteristics and the D range is described with reference to FIG. 6. FIG. 6 is a diagram illustrating the gamma correction characteristics according to the present exemplary embodiment of the present disclosure, and a lateral axis indicates an input and a vertical axis indicates an output. More specifically, the lateral axis in FIG. 6 indicates an input code value of the gamma correction circuit, and the vertical axis indicates an output code value of the gamma correction circuit. The code value depends on the circuit. When the data unit is 10 bits, the code value is a value in a range of 0 to 1023. When the data unit is 12 bits, the code value is a value in a range of 0 to 4096. A curve 601 illustrated in FIG. 6 indicates the gamma correction characteristics of 1600%, a curve 602 indicates the gamma correction characteristics of 800%, a curve 603 indicates the gamma correction characteristics of 400%, and a curve 604 indicates the gamma correction characteristics of 200%. The curve 601 indicates the gamma correction characteristics in which the output signal becomes the maximum value Y max when the input signal is the maximum value X max. Therefore, even if the input signal that has the D range larger than 1600% is generated, the output signal does not become larger than the maximum value Y max, and the signal having the D range of 1600% or more cannot be represented while proper brightness is maintained. The curve 602 has a similar shape half-sized in the input direction to the curve 601. For example, the output value is Y1 when the input value is X max/2 in the curve 601, whereas the output value is Y1 even when the input value is X max in the curve 602. The curve 603 also has a similar shape half-sized in the input direction to the curve 602, and the curve 604 also has a similar shape half-sized in the input direction to the curve 603. Accordingly, when the gamma correction characteristics are changed from the curve 602 (800%) to the curve 601 (1600%), the brightness of the output value to the input value becomes brighter by one stage. Therefore, for example, the gamma correction characteristics indicated by the curve 601 make the brightness of the object darker by one stage. Alternatively, the brightness of the object by the gamma correction characteristics indicated by the curve 601 is equivalent to the brightness of the object by the gamma correction characteristics indicated by the curve 602 in a case where the aperture value or the accumulation time (shutter speed) is lowered by one stage. In other words, by the gamma correction characteristics indicated by the curve 601, the signal of up to the output value Y max can be output and the D range can be increased.

In the above-described exemplary embodiment, the example in which the gamma correction characteristics are changed to amplify the signal has been described. However, configuration is not limited thereto. The D range may be fixed to 1600%, and the amplification factor of the signal may be adjusted when the digital gain is adjusted before the gamma correction characteristics are applied. In this case, the signal can be reduced to ⅛ when the D range is 200%, the signal can be reduced to ¼ when the D range is 400%, and the signal can be reduced to ½ when the D range is 800%. In this case, however, gradation property may be impaired depending on the bit count of the input signal and the output signal because the input signal is reduced at the time when the gamma correction characteristics are applied.

In step S306, the system control unit 50 changes the transmittance of the ND filter, the gain, and the gamma correction characteristics to the respective values determined in steps S301 to S305. The system control unit 50 controls the ND filter 104, the imaging unit 22, and the image processing unit 24 in order to actually adjust the transmittance of the ND filter 104, the gain, and the gamma correction characteristics to the respective determined values.

In the present exemplary embodiment, the allocation of the gain and the gamma correction characteristics corresponding to the amplification factor is uniformized as illustrated in FIG. 5. However, the allocation is not limited thereto. For example, in the case where the S/N-oriented setting is selected, the gain to two times of the amplification factor may be set to 6 dB and the D range in the gamma correction characteristics may be set to 200%. In this configuration, the D range becomes 200% also in the case where the amplification factor is two times. Therefore, the D range can be set to 200% when the exposure index EI is 12 to 200. In other words, as the configuration of the present exemplary embodiment, a configuration is adoptable in which the range of the exposure index EI with the wide D range becomes wider when the D-range-oriented setting is set than when the S/N-oriented setting is set.

As described above, when the configuration of the imaging apparatus according to the present exemplary embodiment is adopted, it is possible to change the transmittance of the ND filter and the amplification factor in conjunction with each other based on the setting of the exposure index EI by the user, by controlling the transmittance of the ND filter, the gain, and the gamma correction characteristics. Further, in a case where the D-range-oriented setting is selected, the imaging is performable with the wide D range within the specific EI range by decreasing the transmittance of the ND filter as much as possible and increasing the amplification factor even when the exposure index EI is the same. This configuration makes it possible to set the various kinds of imaging conditions to acquire an image with quality reflecting intention of the user while preventing operability from being complicated when the transmittance of the ND filter and the amplification factor of the signal are changed in conjunction with each other in response to operation by the user.

A second exemplary embodiment is described. In the above-described first exemplary embodiment, the transmittance of the ND filter and the amplification factor are comprehensively represented by the exposure index EI, and the configuration has been described in which the combination (allocation) of the transmittance of the ND filter and the amplification factor is changed even at the same exposure index EI based on whether the D-range-oriented setting is selected. It is, however, difficult for the user to know the accurate state of the transmittance of the ND filter and the amplification factor from simple display of the exposure index EI. Therefore, there is an instance that the user has difficulty in realizing a change of the image quality corresponding to the gain, the gamma correction characteristics, and the transmittance of the ND filter. Accordingly, in the present exemplary embodiment, a method of displaying the exposure conditions on the display unit when the transmittance of the ND filter and the amplification factor are changed based on the exposure index EI is described. Description of a configuration of the imaging apparatus according to the present exemplary embodiment is omitted because the configuration is substantially the same as the configuration of the above-described first exemplary embodiment, and description is given with the same reference numerals.

Figure 7:
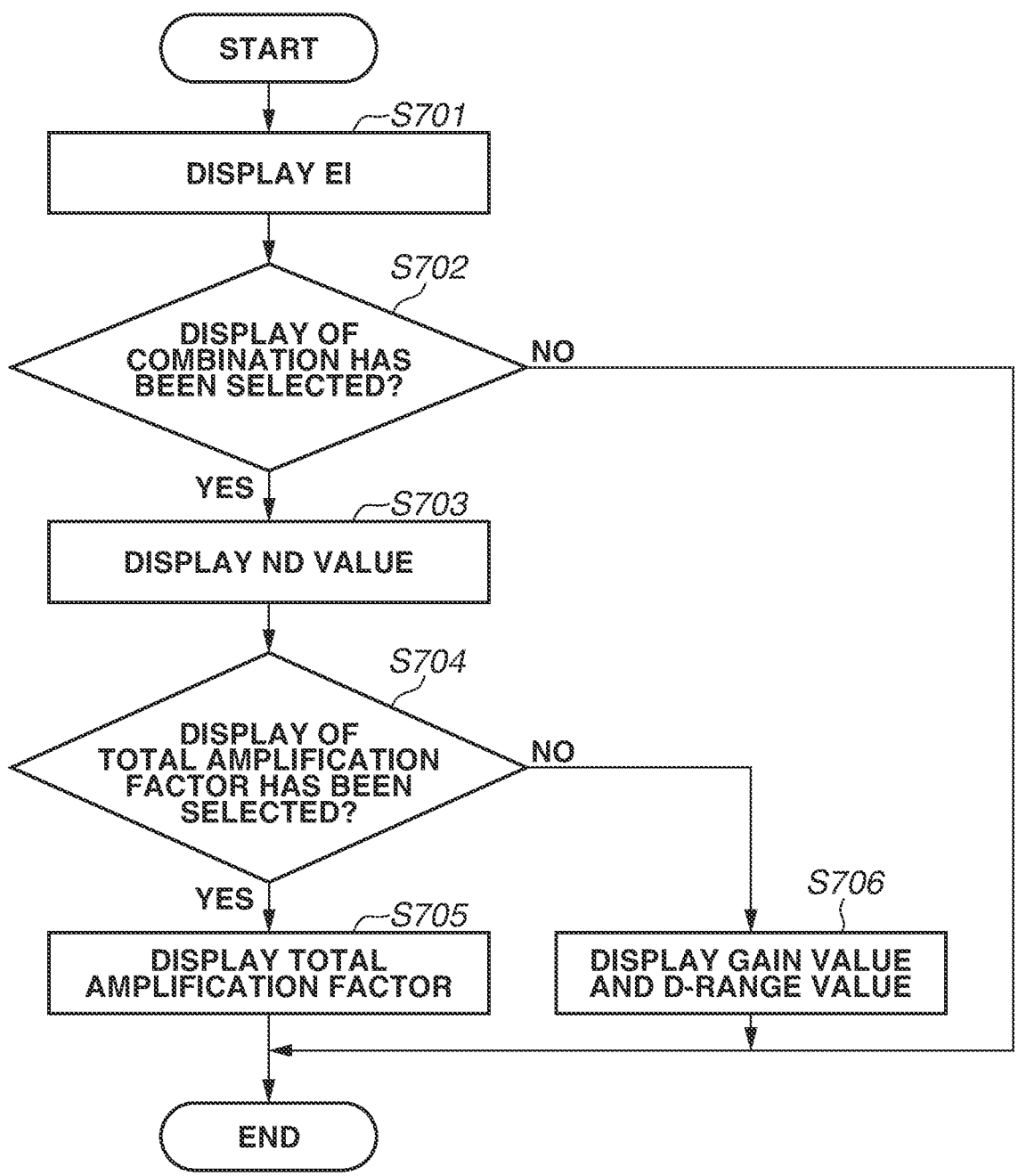
FIG. 7 is a flowchart relating to display control of exposure conditions according to a second exemplary embodiment of the present disclosure.

FIG. 7 is a flowchart relating to display control of the exposure conditions according to the present exemplary embodiment of the present disclosure. The flowchart illustrated in FIG. 7 is started when the imaging apparatus 100 is turned on or at optional timing based on manual operation by the user, and the display is performed on the display unit 28, etc. The flowchart illustrated in FIG. 7 is not limited to the display control of the display unit 28, and is applicable to display control of a display unit (e.g., display apparatus externally connected to imaging apparatus 100) other than the display unit 28.

As illustrated in FIG. 7, after the display control processing is started, the system control unit 50 displays (instructs display of) the exposure index EI on the display unit in step S701. It is assumed that the exposure index EI is previously determined in the configuration described in the first exemplary embodiment.

In step S702, the system control unit 50 determines whether display of information relating to the combination of the transmittance of the ND filter and the amplification factor based on the exposure index EI has been selected. As the information relating to the combination, a percentage of each of the transmittance of the ND filter and the amplification factor may be displayed. In the present exemplary embodiment, the information indicating the actual transmittance of the ND filter and the actual amplification factor is displayed. Presence/absence of the display of the information relating to the combination is optionally settable by the user in the menu screen, etc.

The information relating to the combination may be automatically displayed by determination of the system control unit 50. For example, in a case where a plurality of combinations of the transmittance of the ND filter and the amplification factor is included (present) with respect to the same exposure index EI, the display may be automatically performed. As with the above-described first exemplary embodiment, in a case where any of the exposure index EI of 25 to 400 with the different transmittance of the ND filter and the different amplification factor is set depending on whether the D-range-oriented setting or the S/N-oriented setting is selected, the display may be automatically performed.

In a case where the system control unit 50 determines in step S702 that the display of the information relating to the combination has not been selected (NO in step S702), only the exposure index EI is displayed and the transmittance of the ND filter and the amplification factor are not displayed. In a case where the system control unit 50 determines in step S702 that the display of the information relating to the combination has been selected (YES in step S702), information relating to the transmittance of the ND filter is displayed in step S703.

In step S704, the system control unit 50 determines whether the display of information relating to a total amplification factor has been selected. The information relating to the total amplification factor is information indicating a total amplification factor of the gain and the gamma. As with the above-described information relating to the combination, the information relating to the total amplification factor is also optionally settable by the user.

In a case where the system control unit 50 determines in step S704 that the display of the information relating to the total amplification factor has been selected (YES in step S704), the information relating to the total amplification factor is displayed in step S705. In a case where the system control unit 50 determines in step S704 that the display of the information relating to the total amplification factor has not been selected (NO in step S704), information relating to each of the gain and the D range is displayed in step S706.

Figure 8A:
FIGS. 8A to 8E are diagrams each illustrating information displayed by display control processing according to the second exemplary embodiment of the present disclosure.
Figure 8B:
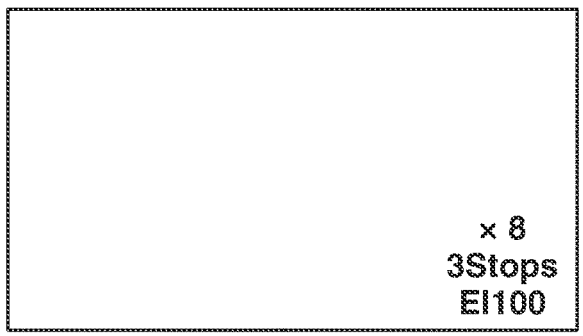
Figure 8C:
Figure 8D:
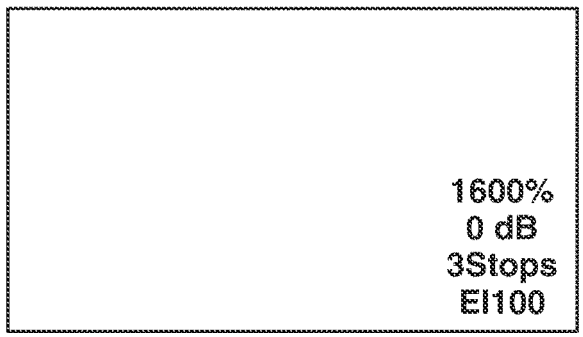
Figure 8E:

FIGS. 8A to 8E are diagrams each illustrating the information displayed by the display control processing according to the present exemplary embodiment of the present disclosure. FIG. 8A illustrates a case where only the exposure index EI is displayed (NO in step S702). FIGS. 8B and 8C each illustrate a case where the information relating to the combination and the information relating to the total amplification factor are displayed. In FIG. 8B, the exposure index EI 100 when the D-range-oriented setting is selected is illustrated. In FIG. 8C, the exposure index EI 100 when the S/N-oriented setting is selected is illustrated. FIGS. 8D and 8E each illustrate a case where the information relating to the combination and the information relating to each of the gain and the D range are displayed. In FIG. 8D, the exposure index EI 100 when the D-range-oriented setting is selected is illustrated. In FIG. 8E, the exposure index EI 100 when the S/N-oriented setting is selected is illustrated.

For example, when FIG. 8D and FIG. 8E are compared, the user can easily verify that the D range is different but the gain is the same between the case where the D-range-oriented setting is selected and the case where the S/N-oriented setting is selected, at the same exposure index EI. The D range is 1600% in the case where the D-range-oriented setting is selected, whereas the D range is 200% in the case where the S/N-oriented setting is selected. The user can easily verify that the signal is amplified by eight times in the gamma in the D-range-oriented setting as compared with the S/N-oriented setting. In this case, the D range is expanded, but the image quality is degraded because the S/N is decreased from the S/N at the time when the signal is amplified to eight times by the gain in the preceding stage.

As described above, when the display control processing according to the present exemplary embodiment is adopted, the exposure conditions corresponding to intention of the user are effectively displayed. This enables the user to easily recognize a difference of the image quality depending on the combination of the gain and the D range, etc.

In the present exemplary embodiment, the configuration in which the D range is displayed as the value representing signal amplification in the gamma has been described. However, the configuration is not limited thereto. For example, magnification with respect to a reference D range may be displayed. In this case, ×1 may be displayed when the D range is 200%, and ×2 may be displayed when the D range is 400%. Both of the D range and the magnification with respect to the reference D range may be displayed.

A third exemplary embodiment is described. In the above-described first and second exemplary embodiments, the example has been described in which the combination of the transmittance of the ND filter and the amplification factor of the signal is changed based on whether the D-range-oriented setting is selected. In the present exemplary embodiment, an example is to be described in which the user selects a desired D range and the combination of the transmittance of the ND filter and the amplification factor of the signal is changed based on the selected D range. Description of a configuration of the imaging apparatus according to the present exemplary embodiment is omitted because the configuration is substantially the same as the configuration of the above-described first exemplary embodiment, and description is given with the same reference numerals.

Figure 9:
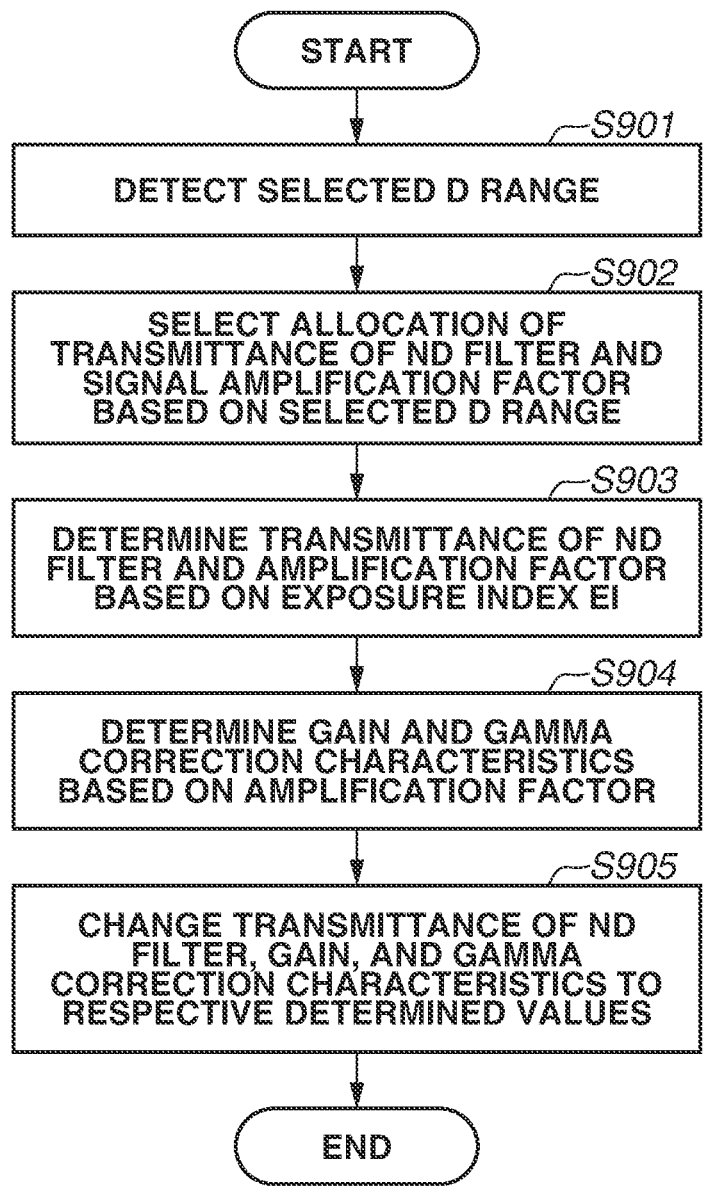
FIG. 9 is a flowchart illustrating processing to determine transmittance of an ND filter, a gain, and gamma correction characteristics according to a third exemplary embodiment of the present disclosure.

FIG. 9 is a flowchart illustrating processing to determine the transmittance of the ND filter 104, the gain, and the gamma correction characteristics according to the present exemplary embodiment of the present disclosure. The flowchart illustrated in FIG. 9 is started when the imaging apparatus 100 is turned on, when the imaging mode is changed, or at optional timing based on manual operation by the user.

In step S901, the system control unit 50 detects previously-selected D range. It is assumed that the D range is selected at optional timing. In the present exemplary embodiment, it is assumed that the D range is previously selected by the user with reference to the menu screen, etc., before the processing in step S901 is executed. In the present exemplary embodiment, any of 200%, 400%, 800%, and 1600% is selectable as the D range.

In step S902, the system control unit 50 selects the combination of the transmittance of the ND filter and the amplification factor of the signal, based on the previously-detected selected D range. FIG. 10 is a diagram illustrating the combination of the transmittance of the ND filter and the amplification factor based on the D range according to the present exemplary embodiment of the present disclosure. As illustrated in FIG. 10, for example, when the D range of 200% is selected, the transmittance of the ND filter is changed at the amplification factor of one time, and the amplification factor is set to one time at the exposure index EI of the wide range (EI 12 to 100). Likewise, when the D range of 400%, 800%, or 1600% is selected, the transmittance of the ND filter is changed at the amplification factor of two times, four times, or eight times, respectively, and the amplification factor is set to two times, four times, or eight times with the exposure index EI of the wide range. Processing in subsequent steps S903 to S905 are the same as the processing in steps S304 to S306 in the above-described first exemplary embodiment. Therefore, description of the processing is omitted.

As described above, the imaging apparatus according to the present exemplary embodiment can set the combination (allocation) of the transmittance of the ND filter and the amplification factor of the signal at each exposure index EI so as to achieve the selected D range with the exposure index EI of the wide range, based on the optionally-selected D range. This configuration makes it possible to set the various kinds of imaging conditions to acquire an image with quality reflecting intention of the user while preventing operability from being complicated when the transmittance of the ND filter and the amplification factor of the signal are changed in conjunction with each other in response to operation by the user.

Although the exemplary embodiments of the present disclosure have been described, the present disclosure is not limited to these exemplary embodiments, and various modifications and alternations can be performed within the scope of the present disclosure. For example, in the above-described exemplary embodiments, the configuration has been described in which the setting such as the D-range-oriented setting and the S/N-oriented setting is selectable and the combination (allocation) of the exposure conditions at the exposure index EI is changed based on the setting. However, the configuration is not limited thereto. For example, a configuration is adoptable in which a setting other than the D-range-oriented setting and the S/N-oriented setting is selectable and the combination of the amplification factor and the transmittance of the ND filter at the exposure index EI is changed based on the setting.

In the above-described exemplary embodiments, the configuration has been described in which total four densities from 0 stop to 3 stops (one of them is transparent with transmittance of substantially 100%) are provided as the transmittance of the ND filter 104. However, the configuration is not limited thereto. For example, transmittance other than the transmittance described above may be provided as the density of the ND filter 104, and the number of stops of the transmittance of the ND filter 104 is not limited.

In the above-described exemplary embodiments, the case where the ND filter 104 is a turret optical filter member has been described. However, the ND filter is not limited thereto. For example, a so-called gradation type in which density is varied depending on a position in one filter, or a configuration in which a plurality of filters with the same density is provided in an optical path and intended density is achieved by a combination of insertion/removal of the plurality of filters to the optical path may be adopted as the ND filter. As the ND filter 104, a light transmittance variable device (so-called variable ND filter), light transmittance of which is electrically controllable, such as a liquid crystal device and an organic electrochromic (EC) device may be adopted.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-065510, filed Mar. 29, 2018, which is hereby incorporated by reference herein in its entirety.

What is claimed is:

1. An imaging apparatus, comprising:
    an imaging device;
    an optical member configured to adjust an amount of light of an object image incident on the imaging device;
    at least one memory storing a program; and
    at least one processor that when executing the program is configured to:
    adjust transmittance of the optical member;
    amplify an image signal output when an image of an object is captured using the imaging device; and
    control exposure by changing an exposure condition including an exposure index,
    wherein a value of the exposure index is settable by a user from predetermined discrete values,
    wherein the exposure condition includes an aperture value and an accumulation time which are different from the exposure index, and
    wherein a combination of an amplification factor of the image signal to be used in amplifying the image signal and the transmittance of the optical member is predetermined for each exposure index settable by the user.

2. The imaging apparatus according to claim 1, further comprising:
    a storage unit configured to store first information relating to the exposure index,
    wherein the first information includes a plurality of combinations of the transmittance of the optical member and the amplification factor of the image signal in a case where the exposure index is a first value.

3. The imaging apparatus according to claim 2,
    wherein, in the case where the exposure index is the first value, the first information includes a first combination in which the transmittance of the optical member is a second value and the amplification factor of the image signal is a third value, and a second combination in which the transmittance of the optical member is a fourth value and the amplification factor of the image signal is a fifth value,
    wherein the second value of the transmittance of the optical member is larger than the fourth value, and
    wherein the third value of the amplification factor of the image signal is smaller than the fifth value.

4. The imaging apparatus according to claim 2,
    wherein the at least one processor is further configured to control display on a display unit, and
    wherein display is controlled such that at least information relating to the first value out of the first information relating to the exposure index is displayed on the display unit.

5. The imaging apparatus according to claim 2, wherein the first information includes two or more combinations of different transmittance of the optical member, a different amplification factor of the imaging signal, and a same exposure index.

6. The imaging apparatus according to claim 4,
wherein the at least one processor is further configured to perform gamma correction on the image signal, and
herein first signal amplification is performed for amplifying the image signal before the gamma correction is performed, and second signal amplification is performed for applying gamma correction characteristics of a similar shape to change a dynamic range and to amplify the image signal.

7. The imaging apparatus according to claim 6, wherein display is controlled such that one or more of information relating to an amplification amount for the first signal amplification or information relating to an amplification amount for the second signal amplification is displayed on the display unit.

8. The imaging apparatus according to claim 2,
wherein, as a setting for capturing an image of an object by the imaging apparatus, a first setting in which importance is placed on a dynamic range and a second setting different from the first setting are settable, and
wherein, in the first information, the transmittance of the optical member is smaller and the amplification factor of the image signal is larger when a predetermined exposure index is set in a case where the first setting is selected than in a case where the second setting is selected.

9. The imaging apparatus according to claim 8, wherein the second setting is a setting in which importance is placed on reduction of a noise amount in the image signal.

10. The imaging apparatus according to claim 8,
wherein the dynamic range is settable as the setting in the imaging of the object by the imaging apparatus, and
wherein the transmittance of the optical member is changed in a case where an amplification amount changed in the second signal amplification with respect to a change of the exposure index becomes an amount corresponding to the set dynamic range.

11. The imaging apparatus according to claim 2,
wherein the amplification factor of the image signal is controlled by gamma correction to be performed on the image signal and gain adjustment of the image signal, and
wherein the amplification factor of the image signal is changed by the gamma correction in preference to a change of the amplification factor of the image signal by the gain adjustment.

12. A method of controlling an imaging apparatus that includes an imaging device and an optical member configured to adjust an amount of light of an object image incident on the imaging device, the method comprising:
adjusting transmittance of the optical member;
amplifying an image signal output when an image of an object is captured with use of the imaging device; and
controlling exposure by changing an exposure condition including an exposure index,
wherein a value of the exposure index is settable by a user from predetermined discrete values,
wherein the exposure condition includes an aperture value and an accumulation time which are different from the exposure index, and
wherein a combination of an amplification factor of the image signal and the transmittance of the optical member is predetermined for each exposure index settable by the user.

13. A non-transitory computer-readable recording medium storing a program for causing a processor to execute a method of controlling an imaging apparatus that includes an imaging device and an optical member configured to adjust an amount of light of an object image incident on the imaging device, the control method comprising:
adjusting transmittance of the optical member;
amplifying an image signal output when an image of an object is captured with use of the imaging device; and
controlling exposure by changing an exposure condition including an exposure index,
wherein a value of the exposure index is settable by a user from predetermined discrete values,
wherein the exposure condition includes an aperture value and an accumulation time which are different from the exposure index, and
wherein a combination of an amplification factor of the image signal and the transmittance of the optical member is predetermined for each exposure index settable by the user.

* * * * *